April 7, 1964   R. J. ROGERS   3,128,047
SELF-PROPELLED MOBILE LAWN SPRINKLER
Filed Jan. 8, 1963   3 Sheets-Sheet 3
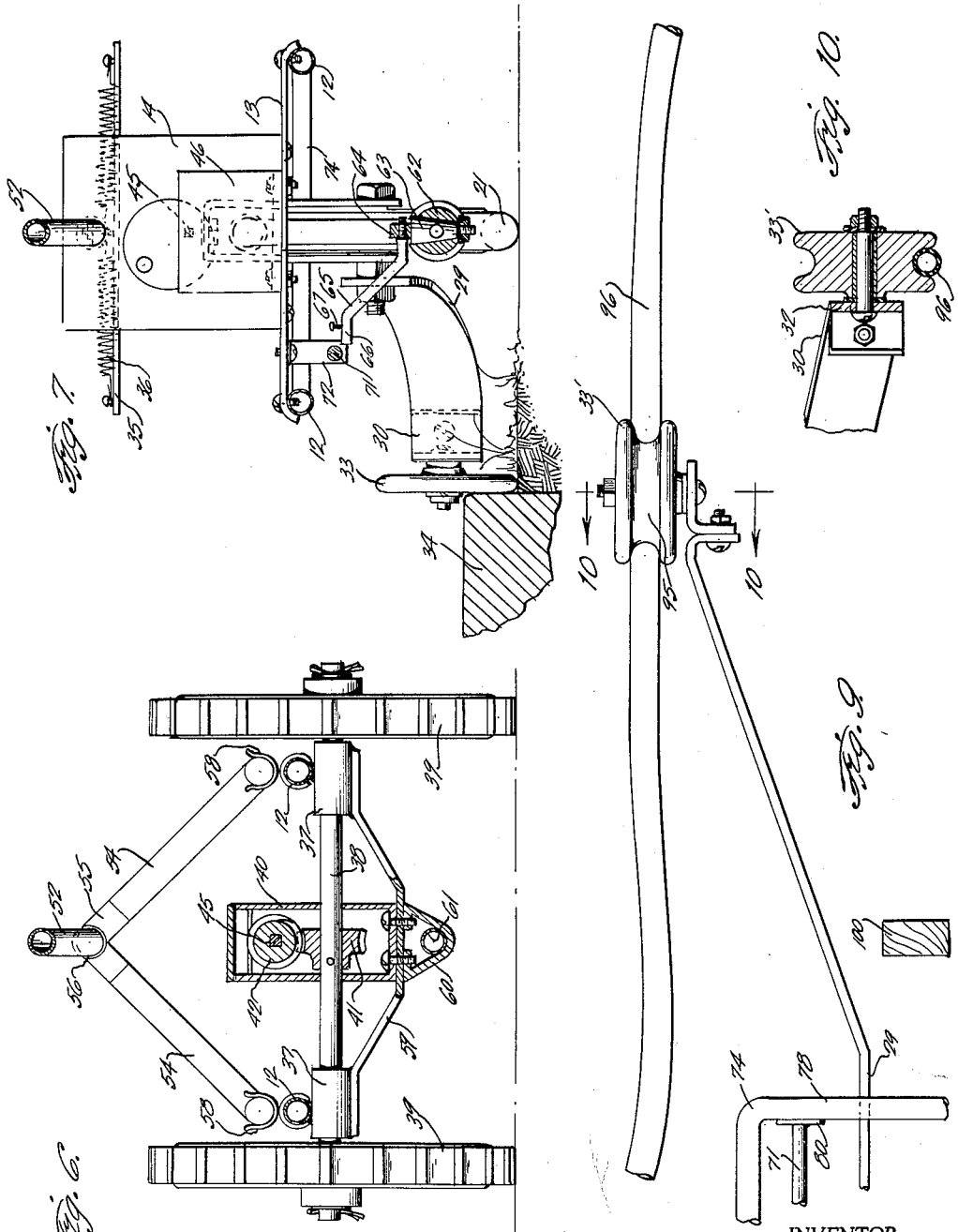
INVENTOR.
RICHARD J. ROGERS
BY
McMorrow, Berman & Davidson
Attorneys

United States Patent Office 3,128,047
Patented Apr. 7, 1964

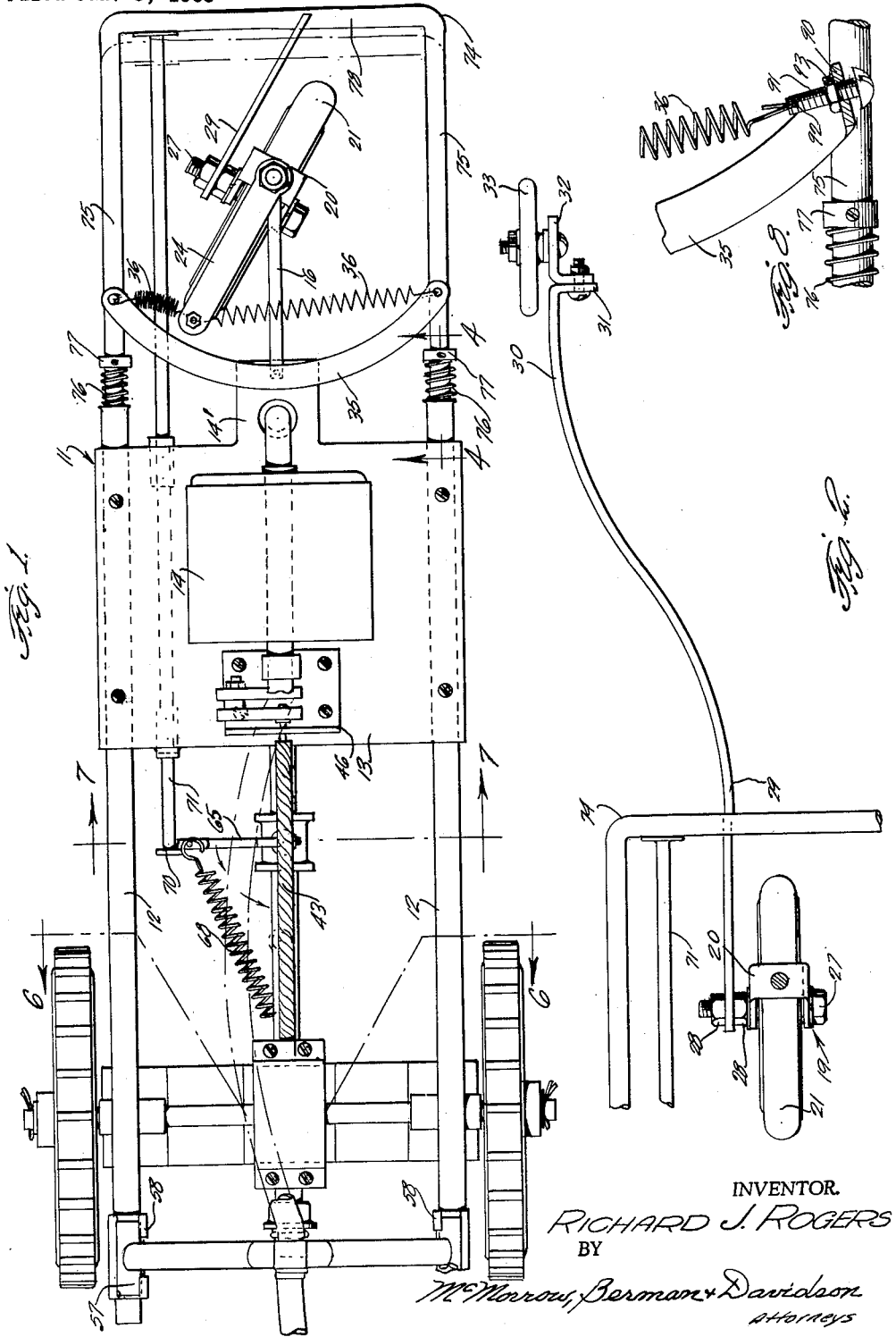

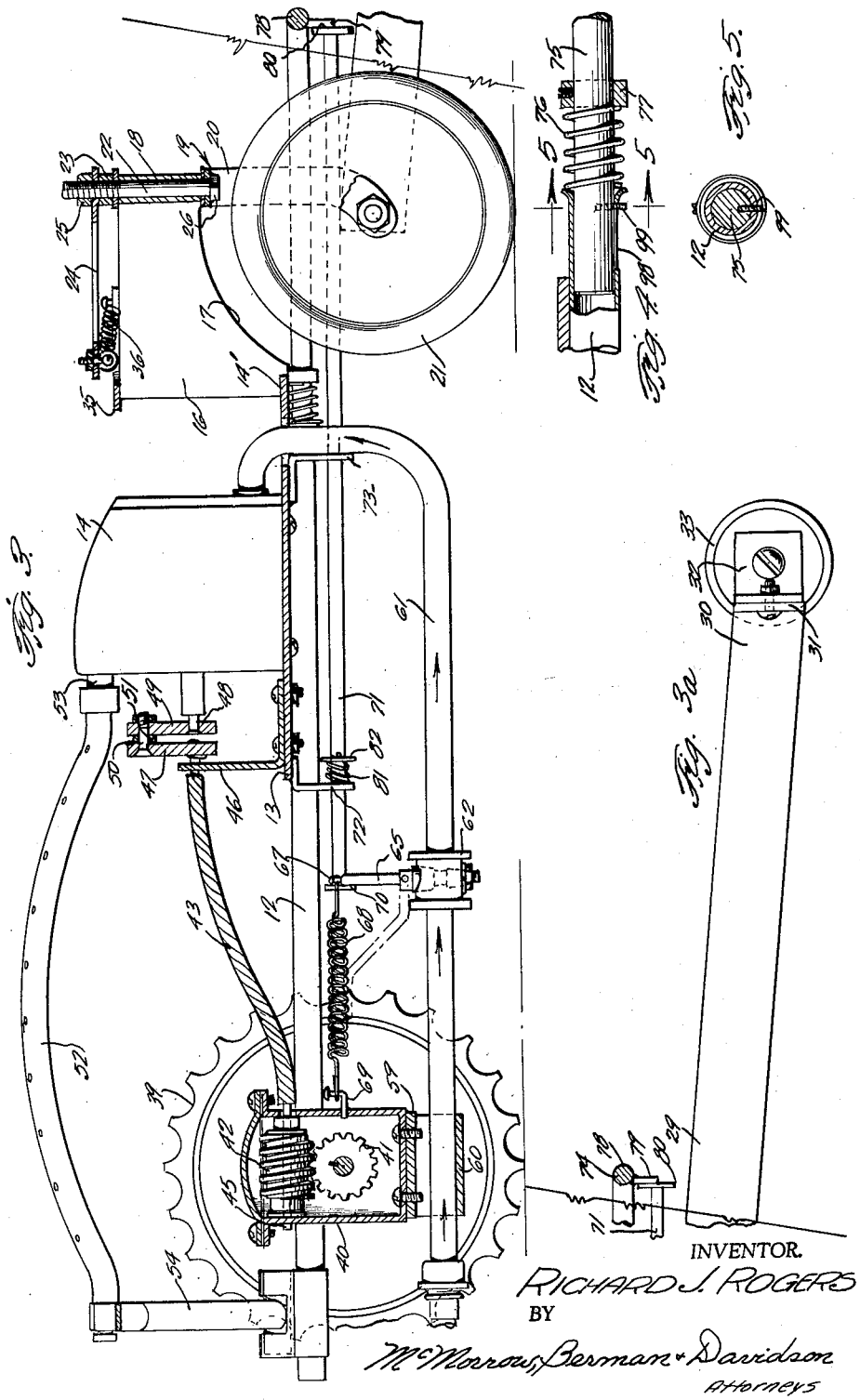

3,128,047
SELF-PROPELLED MOBILE LAWN SPRINKLER
Richard J. Rogers, 400 E St., Oxnard, Calif.
Filed Jan. 8, 1963, Ser. No. 250,063
5 Claims. (Cl. 239—191)

This invention relates to lawn sprinklers, and more particularly to a lawn sprinkler of the self-propelled automatic type arranged so that it will travel along a predetermined path and operate along said path until it reaches a desired terminal point, at which point it will stop.

A main object of the invention is to provide a novel and improved automatic self-propelled lawn sprinkler which is relatively simple in construction, which involves easily manufacturable parts, and which is reliable in operation.

A further object of the invention is to provide an improved automatic self-propelled lawn sprinkler which is inexpensive to fabricate, which is sturdy in construction, which will travel along a designated predetermined path, such as the edge of a curb or path, or along a hose laid out on a lawn, the sprinkler being provided with means to automatically shut off the supply of water thereto when it encounters an obstruction, such as a stake in the ground, or the like, whereby operation of the sprinkler may be terminated after it has traveled along a predetermined designated path.

Further objects and advantages of the invention will become apparent from the following description and claims, and from the accompanying drawings, wherein:

FIGURE 1 is a fragmentary top plan view of an improved self-propelled automatic sprinkler constructed in accordance with the present invention.

FIGURE 2 is a top plan view of the forward portion of the sprinkler of FIGURE 1, showing the guiding member employed with the sprinkler.

FIGURE 3 is a vertical longitudinal cross sectional view taken through the sprinkler of FIGURE 1.

FIGURE 3a is a vertical longitudinal cross sectional view taken through the forward portion of the sprinkler frame and showing the guiding member of the sprinkler in side elevational view, FIGURE 3a being a continuation of FIGURE 3.

FIGURE 4 is an enlarged cross sectional detail view taken substantially on the line 4—4 of FIGURE 1.

FIGURE 5 is a transverse cross sectional view taken on the line 5—5 of FIGURE 4.

FIGURE 6 is a transverse vertical cross sectional view taken substantially on the line 6—6 of FIGURE 1.

FIGURE 7 is a transverse vertical cross sectional view taken substantially on the line 7—7 of FIGURE 1 and showing the guide wheel of the sprinkler engaged with the side edge of a curb.

FIGURE 8 is an enlarged fragmentary horizontal cross sectional view taken through one end portion of the transversely extending arcuate frame bar associated with the pivoted front wheel assembly of a lawn sprinkler according to the present invention, showing a modified form thereof wherein the associated front wheel centering spring is adjustably attached thereto.

FIGURE 9 is a fragmentary horizontal plan view generally similar to FIGURE 2 showing a modified form of guide roller, namely, a peripherally grooved guide roller which is engaged on a hose, which serves as the path-defining means for the lawn sprinkler.

FIGURE 10 is an enlarged cross sectional detail view taken substantially on the line 10—10 of FIGURE 9.

Referring to the drawings, and more particularly to FIGURES 1 to 7, 11 generally designates a mobile sprinkler constructed in accordance with the present invention. The sprinkler 11 comprises an elongated supporting frame consisting of a pair of longitudinal side bars 12, 12 connected by a transversely extending horizontal supporting plate 13 on which is mounted a conventional hydraulic motor 14. The plate 13 is formed at its forward end edge with a forwardly projecting lug 14', located substantially at the mid portion of said forward edge, and rigidly secured on the lug 14' is a vertical, longitudinal, forwardly extending plate member 16. Plate member 16 is formed with the upwardly and forwardly inclined arcuate bottom edge 17, and is integrally formed at its front edge with a vertical bearing sleeve 18.

Designated generally at 19 is a front wheel supporting assembly comprising a yoke member 20 between the arms of which is rotatably mounted a front supporting wheel 21. The bight portion of the yoke member 20 is pivotally connected to the front end of the plate 16 by a pivot bolt 22 which extends upwardly through the horizontal bight portion of the yoke member 20 and through the sleeve 18, being provided with a retaining nut 23. A control arm 24 is secured on the top end portion of the bolt 22 and clamps against the retaining nut 23 by a further nut 25. The head portion of the bolt 22, shown at 26, is rigidly connected to the bight portion of the yoke 20 in any suitable manner, for example, by being welded thereto, so that arm 24 is rigid relative to yoke 20 but bolt 22 is freely rotatable in the sleeve 18.

Wheel 21 is journaled on a transversely extending axle bolt 27, and rigidly secured to the inner end of said axle bolt, as by opposing nuts 28, 28 is a forwardly extending guiding arm 29 which has the laterally offset front portion 30. The offset front portion 30 is formed with the right angled bend 31 to which is secured an angle bracket 32. Journaled to angle bracket 32 is the vertical guide roller 33 which is thus disposed forwardly and laterally of the main frame of the sprinkler and which is engageable with the side edge of a curb 34, or other vertically projecting guiding body, in the manner illustrated in FIGURE 7 to guide the sprinkler along its intended path of travel.

Designated at 35 is an arcuate transversely extending bar member which is rigidly secured at its mid portion on the rear end of the top edge of plate member 16, so that the bar member 35 is rigidly secured to the frame of the sprinkler with its concave edge facing forwardly. Respective coiled springs 36, 36 connect the opposite ends of the arcuately curved bar member 35 with the rear end of the arm 24, exerting a biasing action on the front wheel assembly 19 which urges the arm 24 towards a centered position midway between the ends of the transverse bar member 35, and which therefore urges the wheel 21 towards a position in longitudinal alignment with the frame of the sprinkler. As will be readily apparent from FIGURE 1, the wheel assembly 19 may be rotated around its pivotal axis, namely, the vertical axis of bolt 22, in accordance with the curvature of the guiding curb 34, or other guiding body with which the sprinkler is employed, the springs 36 being yieldable to allow angular deviation of the wheel assembly 19 from its normal direction.

Rigidly secured beneath the rear portions of the frame bars 12, 12 in transverse alignment are respective bearing sleeves 37, 37 through which extends the transversely extending rear axle 38, the axle being rotatable in the sleeves 37, 37. Secured on the ends of the axle 38 are respective ground-engaging traction wheels 39, 39. The intermediate portion of the axle 38 extends rotatably through a gear box 40, and secured on the axle within the gear box is a worm gear 41 which is meshingly engaged by a worm 42 journaled in the gear box 40 transverse to the axle 38 and being drivingly connected by a flexible drive cable 43 to the output shaft of the hydraulic motor 14.

As shown in FIGURE 3, the driving shaft element 45 of the flexible cable 43 is rotatably supported at its forward end in the upstanding portion of an angle bracket 46 secured on the main supporting plate 13, and an arm 47 is rigidly secured to the forward end of the flexible shaft element 45. The output shaft 48 of the hydraulic motor 14 has rigidly secured thereon a similar arm 49 which extends parallel to the arm 47 and which is rigidly connected thereto by a fastening bolt 50, a spacing washer 51 being provided on the bolt between the arms 47 and 49.

A longitudinal arcuately shaped tubular sprinkler head 52 is mounted on the frame of the device, the forward end of the sprinkler head being connected to the output conduit 53 of the hydraulic motor 14 and the rear end of the sprinkler head 52 being supported on a tubular frame structure comprising a pair of upwardly converging arms 54, 54 connected at their top ends by an elbow 55, the elbow being provided with an integral supporting sleeve 56 supportingly receiving the rear end of the sprinkler head 52. The arms 54, 54 are provided at their bottom ends with longitudinally extending foot portions 57 which are lockingly received in U-shaped resilient fastening clips 58, 58 secured on the frame bars 12, 12.

A transversely extending, downwardly bowed supporting plate 59 is secured at its respective ends to the undersides of the sleeve members 37, 37, the intermediate portion of the plate member 59 being rigidly fastened to the bottom wall of the gear box 40 and being provided with a depending supporting loop 60 through which extends the water supply conduit 61 which leads to the intake port of the hydraulic motor 14. Conduit 61 is provided with a control valve assembly 62 which includes the frusto-conical rotatable valve element 63. Element 63 is provided with the upstanding top lug 64 to which is secured a control arm 65 which projects substantially perpendicular to the longitudinal vertical plane of the sprinkler when the valve 62 is in its open condition, as shown in FIGURE 7. The arm 65 is provided with the upwardly offset outer end portion 66. A coiled spring 68 connects an upstanding pin 67 on arm portion 66 to a retaining hook 69 secured to the front wall of gear box 40, as shown in FIGURE 3, biasing the arm 65 in a counterclockwise direction, as viewed in FIGURE 1, namely, in a direction to move the arm into longitudinal alignment with the frame of the sprinkler, and to close the valve 62. The valve 62 is held in an open position, namely, in the position illustrated in FIGURE 7 by the engagement of the outer end of the arm 65 with the end flange 70 of a longitudinally extending trip rod 71 slidably supported in depending bracket 72 and 73 secured to the rear and front marginal portions of the plate member 13.

Designated at 74 is a generally U-shaped, horizontal bumper member having side arms 75, 75 which are slidably received in the forward end portions of the tubular frame members 12, 12. Bumper member 74 is thus supported horizontally in a position projecting forwardly from the frame of the sprinkler member, and is biased forwardly by respective coiled springs 76, 76 surrounding the side arms 75, 75 and bearing between the forward ends of the frame bars 12, 12 and respective bearing collars 77, 77 secured on side arms 75, 75, as shown in FIGURE 1. The transversely extending bight portion 78 of the bumper member 74 carries a depending lug 79 which is normally engaged by an abutment flange 80 secured on the forward end of the trip rod 71, being urged toward such engagement by suitable biasing means, such as a coiled spring 81 provided on the rod 71 and bearing between the bracket 72 and a washer 82 mounted on the rod 71, as shown in FIGURE 3.

When the bumper member 74 encounters an obstruction, for example, a vertical stake 100 or other obstruction located in the path of forward movement of the sprinkler assembly, the bumper member 74 is pushed rearwardly relative to the frame of the sprinkler member, moving the trip rod 71 rearwardly and causing the rear flange 70 of the trip rod to move rearwardly a sufficient distance to allow the end of arm 65 to slip past said flange 70 under the biasing action of the spring 68. When this occurs the arm 65 is rotated to the dotted view position thereof shown in FIGURE 3, namely, to a position substantially in longitudinal alignment with the frame of the sprinkler, causing the valve 62 to close. This cuts off the supply of water to the motor 14 and also to the sprinkler head 52, terminating the operation of the sprinkler.

The sprinkler illustrated in FIGURES 1 to 7 may be placed in operation by opening the valve 62, the valve being held open by the engagement of the offset end portion 66 of arm 65 forwardly of the flange 70, as illustrated in FIGURE 1. The motor 14 will then be driven by the water pressure, causing the traction wheels 39 to revolve, while simultaneously the water leaving the motor 14 will escape through the sprinkler head 52. The guide roller 33 will engage against the edge of a curb 34, or other reference body adapted to guide the sprinkler in its movement, so that the sprinkler will travel along the edge of the member 34 while watering the lawn adjacent thereto. A stake or other suitable obstruction may be employed to define the end of the path of movement of the sprinkler, the obstruction being placed so that it will be engaged by the bumper member 74. When this occurs, the bumper member 74 is moved rearwardly relatively to the frame of the sprinkler, allowing the arm 65 to disengage from the flange 70 in the manner above described, whereby the valve 62 will close and will terminate the operation of the sprinkler.

In the embodiment illustrated in FIGURE 8, the member 35 is provided at its ends with upstanding lugs 90 through which are threaded tension-adjusting bolts 91, with the outer ends of the springs 36 extending through retaining apertures 92 provided in the bolts 91. The tension of the springs 36 may thus be adjusted by adjusting the bolts 91 in the lugs 90, and the adjustment may be locked by tightening a lock nut 93 provided on each bolt so that the lock nut 93 clampingly engages against the inside surface of the associated lug 90.

In the embodiment illustrated in FIGURES 9 and 10, a peripherally grooved guide roller 33' is employed in place of the guide roller 33 shown in FIGURE 2, the guide roller 33' having a groove 95 of sufficient size to receive a garden hose 96, as shown in FIGURE 9. The roller 33' will thus travel along the garden hose 96, so that the garden hose serves as a guide track means for guiding the path of travel of the sprinkler, in a manner similar to that in which the curb 34 serves as the guide means in the previously described forms of the invention.

As shown in FIGURES 4 and 5, the side arms portions 75, 75 of the bumper member 74 are slidably received in the forward end portions of the tubular frame members 12, said tubular frame members being formed with longitudinal slots 98 through which extend retaining screws 99 engaged in the inner end portions of the side arms 75, so that the side arms are retained in the tubular frame bars 12. The springs 76, acting against the collars 77 urge the bumper side arms 75 outwardly, so that normally the retaining screws 99 engage against the forward ends of the retaining slots 98.

While certain specific embodiments of an improved self-propelled mobile sprinkler have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A mobile sprinkler comprising an elongated supporting frame including a pair of spaced parallel horizontal longitudinally extending side frame bars, a supporting wheel assembly pivoted to one end of said frame, a guiding member rigidly connected to said pivoted supporting wheel assembly, ground-engaging propelling means mounted on the frame adjacent its other end, a hydraulic motor mounted on the frame, means drivingly connecting said motor to said propelling means, a sprinkler head mounted on the frame, a fluid supply conduit mounted on the frame and connected to said motor and said sprinkler head, a shut-off valve in said fluid supply conduit, a bumper member slidably and yieldably mounted on the forward portions of the frame bars and being engageable with an obstacle in the path of movement of the frame, whereby the bumper member will be moved rearwardly relative to the frame upon engaging the obstacle, and means to close said shut-off valve responsive to said rearward movement of the bumper member.

2. A mobile sprinkler comprising an elongated supporting frame including a pair of spaced parallel horizontal longitudinally extending side frame bars, a supporting wheel assembly pivoted to one end of said frame, a guiding member rigidly connected to said pivoted supporting wheel assembly, ground-engaging propelling means mounted on the frame adjacent its other end, a hydraulic motor mounted on the frame, means drivingly connecting said motor to said propelling means, a sprinkler head mounted on the frame, a fluid supply conduit mounted on the frame and connected to said motor and said sprinkler head, a shut-off valve in said fluid supply conduit, a horizontally extending bumper member slidably mounted in the forward portions of the frame bars and being engageable with the obstacle in the path of movement of the frame, spring means yieldably urging the bumper member forwardly relative to the frame, whereby the bumper member will be moved rearwardly relative to the frame upon engaging the obstacle, and means to close said shut-off valve responsive to such rearward movement of the bumper member.

3. A mobile sprinkler comprising an elongated supporting frame including a pair of spaced parallel horizontal longitudinally extending side frame bars, a supporting wheel assembly pivoted to one end of said frame, a guiding member rigidly connected to said pivoted supporting wheel assembly, ground-engaging propelling means mounted on the frame adjacent its other end, a hydraulic motor mounted on the frame, means drivingly connecting said motor to said propelling means, a sprinkler head mounted on the frame, a fluid supply conduit mounted on the frame and connected to said motor and said sprinkler head, a shut-off valve in said fluid supply conduit, spring means biasing said shut-off valve towards a closed position, releasable catch means holding the valve in an open position, a bumper member slidably and yieldably mounted on the forward portions of the frame bars and being engageable with an obstacle in the path of movement of the frame, whereby the bumper member will be moved rearwardly relative to the frame upon engaging the obstacle, and means to operate said catch means to close said shut-off valve responsive to such rearward movement of the bumper member.

4. A mobile sprinkler comprising an elongated supporting frame, including a pair of spaced parallel horizontal longitudinally extending side frame bars, a supporting wheel assembly pivoted to one end of said frame, a guiding member rigidly connected to said pivoted supporting wheel assembly, ground-engaging propelling means mounted on the frame adjacent its other end, a hydraulic motor mounted on the frame, means drivingly connecting said motor to said propelling means, a sprinkler head mounted on the frame, a fluid supply conduit mounted on the frame and connected to said motor and said sprinkler head, a shut-off valve in said fluid supply conduit, spring means biasing said shut-off valve towards a closed position, releasable catch means holding the valve in an open position, a horizontally extending bumper member slidably mounted in the forward portions of the frame bars and being engageable with an obstacle in the path of movement of the frame, spring means yieldably urging the bumper member forwardly relative to the frame, whereby the bumper member will be moved rearwardly relative to the frame upon engaging the obstacle, and means to operate said catch means to close said shut-off valve responsive to such rearward movement of the bumper member.

5. A mobile sprinkler comprising an elongated supporting frame including a pair of spaced parallel horizontal longitudinally extending side frame bars, a supporting wheel assembly pivoted to one end of said frame, a guiding member rigidly connected to said pivoted supporting wheel assembly, ground-engaging propelling means mounted on the frame adjacent its other end, a hydraulic motor mounted on the frame, means drivingly connecting said motor to said propelling means, a sprinkler head mounted on the frame, a fluid supply conduit mounted on the frame and connected to said motor and said sprinkler head, a shut-off valve in said fluid supply conduit, an operating arm on said valve, spring means biasing said operating arm in a direction to close said valve, a horizontal extending bumper member slidably mounted in the forward portions of the frame bars and being engageable with an obstacle in the path of movement of the frame, spring means yieldably urging the bumper member forwardly relative to the frame, whereby the bumper member will be moved rearwardly relative to the frame upon engaging the obstacle, a longitudinal catch rod slidably mounted in the frame and engaging said bumper member at its forward end, and means on the rear end of the catch rod releasably engaging said operating arm, said arm disengaging from said last-named means responsive to rearward movement of said catch rod, whereby to allow said valve to close.

References Cited in the file of this patent

UNITED STATES PATENTS

| | | |
|---|---|---|
| 1,142,448 | Lord | June 8, 1915 |
| 1,919,703 | Nielsen | July 25, 1933 |
| 2,493,528 | Crowder | Jan. 3, 1950 |
| 2,575,828 | Muench | Nov. 20, 1951 |
| 2,602,696 | Salatin | July 8, 1952 |
| 2,716,573 | Egly et al. | Aug. 30, 1955 |
| 2,883,116 | Muench | Apr. 21, 1959 |
| 3,043,520 | Nelson | July 10, 1962 |